(12) United States Patent
Popham

(10) Patent No.: US 6,349,500 B1
(45) Date of Patent: Feb. 26, 2002

(54) MOUND-LIKE TREE SKIRT

(76) Inventor: Peggy L. Popham, P.O. Box 149, Okeana, OH (US) 45053

( * ) Notice: Subject to any disclaimer, the term of this patent is extended or adjusted under 35 U.S.C. 154(b) by 0 days.

(21) Appl. No.: 09/400,251

(22) Filed: Sep. 21, 1999

Related U.S. Application Data

(63) Continuation of application No. 08/805,125, filed on Feb. 24, 1997.

(51) Int. Cl.[7] .......................... A01G 17/00; A01G 13/02
(52) U.S. Cl. ..................... 47/25; 47/32; 47/23; 52/102; 2/222; 43/108
(58) Field of Search ................................ 47/25, 32, 23, 47/36, 33, 29, 40.5, 24, 19, 20, 21, 22; 52/102; 2/222; 43/108

(56) References Cited

U.S. PATENT DOCUMENTS

| | | |
|---|---|---|
| 313,424 A | 3/1885 | Hughes |
| 2,978,837 A | 4/1961 | Daniels |
| 3,005,287 A | 10/1961 | Dudley |
| 3,305,969 A | 2/1967 | Mattson |
| 4,268,992 A | 5/1981 | Scharf, Sr. |
| 4,336,666 A | 6/1982 | Caso |
| 4,502,244 A | 3/1985 | Yoham |
| 4,590,705 A | 5/1986 | Prince |
| 4,648,203 A | 3/1987 | Worzek |
| 4,934,093 A | 6/1990 | Yanna |
| 4,986,025 A | 1/1991 | Imperial |
| 5,058,317 A | 10/1991 | McMurtrey |
| 5,085,001 A | 2/1992 | Crawley |
| 5,231,793 A | 8/1993 | Allen |
| 5,367,822 A * | 11/1994 | Beckham ........................ 47/25 |
| 5,396,731 A | 3/1995 | Byrne |

FOREIGN PATENT DOCUMENTS

| | | |
|---|---|---|
| GB | 2227152 | 7/1990 |

OTHER PUBLICATIONS

"Weed Collar" Directions flier, 1 page.

* cited by examiner

*Primary Examiner*—Charles T. Jordan
*Assistant Examiner*—Andrea M. Valenti
(74) *Attorney, Agent, or Firm*—Charles R. Wilson

(57) ABSTRACT

A mound-like tree skirt has a generally dome-shaped body and is designed for placement around a tree. The body has an apex with an approximately centered opening to accommodate the tree's trunk. It also has a peripheral edge with a substantially horizontal anchor lip extending circumferentially therefrom. A radial slit extending from the approximately centered opening to the peripheral edge allows the mound-like tree skirt to be slipped around a tree until the tree's trunk is in the centered opening. At least one hole in the anchor lip and a corresponding number of anchor stakes hold the tree skirt in position.

16 Claims, 3 Drawing Sheets

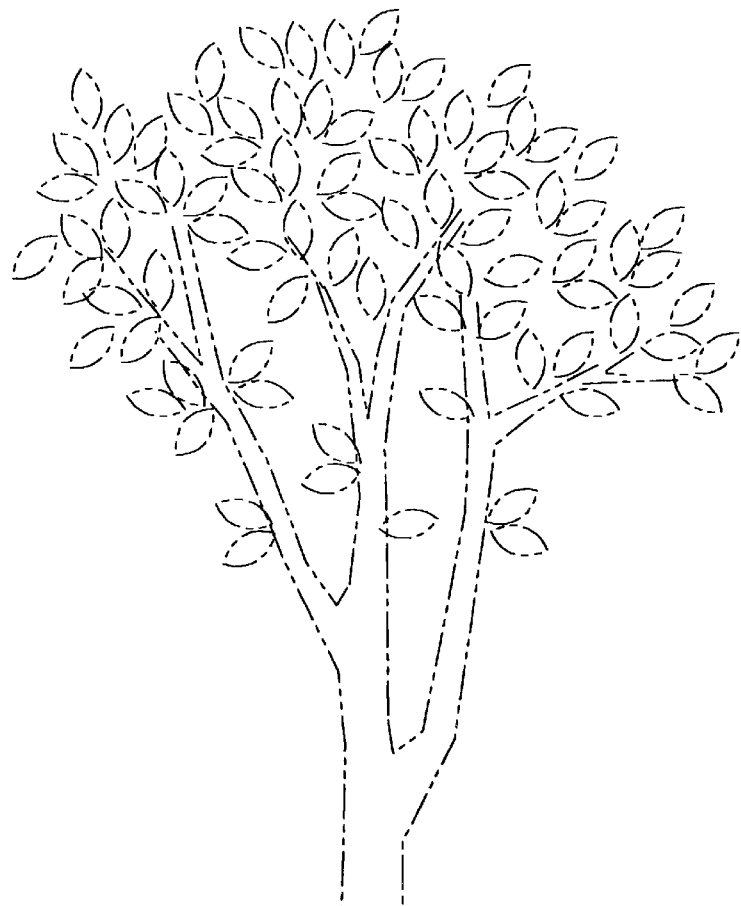
FIG. 1
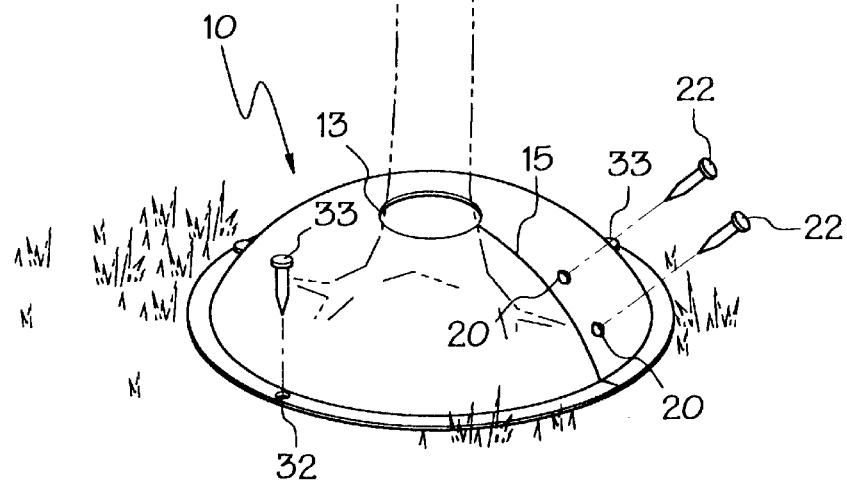

MOUND-LIKE TREE SKIRT

FIELD OF THE INVENTION

This is a continuation of application Ser. No. 08/805,125, filed Feb. 24, 1997.

This invention relates to a tree skirt. More particularly, the invention relates to a mound-like tree skirt which provides a longlasting and decorative means to protect a tree trunk.

BACKGROUND OF THE INVENTION

Landscaping has long been an important activity to many homeowners, commercial establishments and office complexes. A well maintained lawn or tree area enhances the appearance of any structure. Much effort normally must be expended in initially landscaping an area and then maintaining it throughout the growing season.

An important aspect to many landscaping plans is the use of natural mulch around trees, shrubs, and flowering plants. Shredded bark and peat moss are examples of very common natural mulches. The mulch provides an aesthetic effect. It also provides a more functional benefit. The mulch which covers the soil inhibits the growth of grass or weeds by blocking out sunlight. It also slows the evaporation of water from the soil. In cold temperature zones, the mulch serves as an insulator to keep roots warmer and less likely to be killed or damaged by frigid temperatures. Most importantly, a layer of mulch properly placed will protect the trees and other plants from accidental contact and resultant damage by lawncare equipment such as lawnmowers and mechanical string trimmers.

Natural mulches are reasonably priced and given their well known attributes as above discussed are widely used. One disadvantage is that they must be continually replenished. Being a natural material, they tend to deteriorate over time. This causes them to lose their pleasing appearance and functional qualities. Several manufactured articles and devices have been suggested as natural mulch substitutes. For example, U.S. Pat. Nos. 10 3,305,969, 4,268,992, 4,502, 244, 4,590,705, 4,648,203, 4,934,093, 4,986,025, 5,058,317, 5,085,001 and 5,231,793 all disclose manufactured articles for placement around a tree. The articles are made of plastic. All tend to lay flat on the ground and would appear to retard the growth of unwanted vegetation and retard the evaporation of water from the soil around the tree. However, none of the known articles have all the attributes of a tree skirt needed to make it a commercial success. Most importantly, the known articles do not have a natural appearance. That is, they all have an artificial look which is not in keeping with a proper landscape plan.

There has now been developed a mound-like tree skirt which has all the desired attributes demanded by the homeowner and commercial landscaper. The mound-like tree skirt of the invention has a pleasing natural look which approximates that of mounded mulch commonly placed around trees. It is economical to produce and easy to use. It is functional in that it inhibits the growth of unwanted vegetation around the tree's trunk and retards the evaporation of water from the soil directly under it. It is also durable and retains its pleasing natural appearance for long periods of time.

SUMMARY OF THE INVENTION

A mound-like tree skirt is configured for placement around a tree trunk. The tree skirt has an open-bottom generally domeshaped body with an apex and a ground-contacting peripheral edge. It has an approximately centered opening in the apex of the dome to accommodate the tree trunk. It also has a radial slit extending from the approximately centered opening to the peripheral edge which is used to spread apart the dome-shaped body in the slit area to fit around the tree during an initial placement process. The tree skirt further has a substantially horizontal anchor lip extending circumferentially from the peripheral edge. The anchor lip has at least one hole to receive a corresponding number of anchor stakes. The anchor lip is intended to lie substantially flat on the ground and, together with the anchor stakes, holds the tree skirt in place.

Optional, though highly preferred, features of the mound-like tree skirt include a closure means operably associated with the radial slit to hold edges of the slit together and a netting in the approximately centered opening to retard unwanted vegetation growth at the tree trunk's base. The tree skirt of the invention provides a long-lasting economical and decorative means to protect a tree trunk from accidental contact with lawn care equipment.

BRIEF DESCRIPTION OF THE DRAWINGS

FIG. 1 is an environmental view of the mound-like tree skirt of the invention in position around a tree trunk base.

DETAILED DESCRIPTION OF THE INVENTION

The article of the invention is particularly useful for placement around a tree trunk at its base. It is also useful as a decorative protective article which can be used with shrubs, bushes, and other plantings which are commonly found in residential, commercial and business office settings.

With reference to FIG. 1, there is shown the mound-like tree skirt 10 of the invention positioned about and in surrounding relation to a base of a tree trunk. Features of the tree skirt 10 which contribute to its usefulness are described in detail in the following paragraphs.

As best seen in FIGS. 1–4, the mound-like tree skirt 10 is a one-piece article with an open-bottom generally dome-shaped body 11. The body must have sufficient rigidity to retain its shape as shown without collapsing on itself. At the same time, the body must have sufficient flexibility to permit a flexing or bending to temporarily split it apart during an installation step as further described below. The generally dome-shaped body 11 is made of a semi-rigid material having the desired degrees of rigidity and flexibility to permit the aforedescribed functions. Preferably, the structure is made from a durable weather-resistant synthetic polymeric material and manufactured as a unitary molded article. It could as well be made from a fibrous reinforced resinous material, a wood pulp material or any other synthetic or natural material having the aforementioned physical characteristics. Any manufacturing process conducive to producing a relatively large one-piece structure of the type described in an efficient manner can be used.

Figure 3:
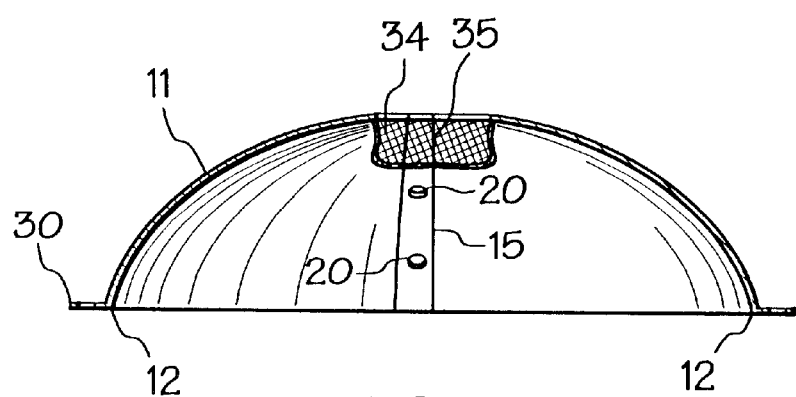
FIG. 3 is a side elevational view in section of the mound-like tree skirt of FIG. 2 taken along line 3—3 thereof.

The tree skirt as best seen in FIGS. 1 and 3 is generally domeshaped. It creates an interior open space having a base diameter as measured from its peripheral inside edge 12 of from about eighteen inches to about thirty-six inches. The dome-shaped body 11 has a height of from about three inches to about nine inches. A preferred tree skirt has an interior base diameter of from about twenty-four inches to about thirty inches and a height of from about four inches to about eight inches. It should be understood other structures of the same general curved and mounded shape can be used.

Figure 2:
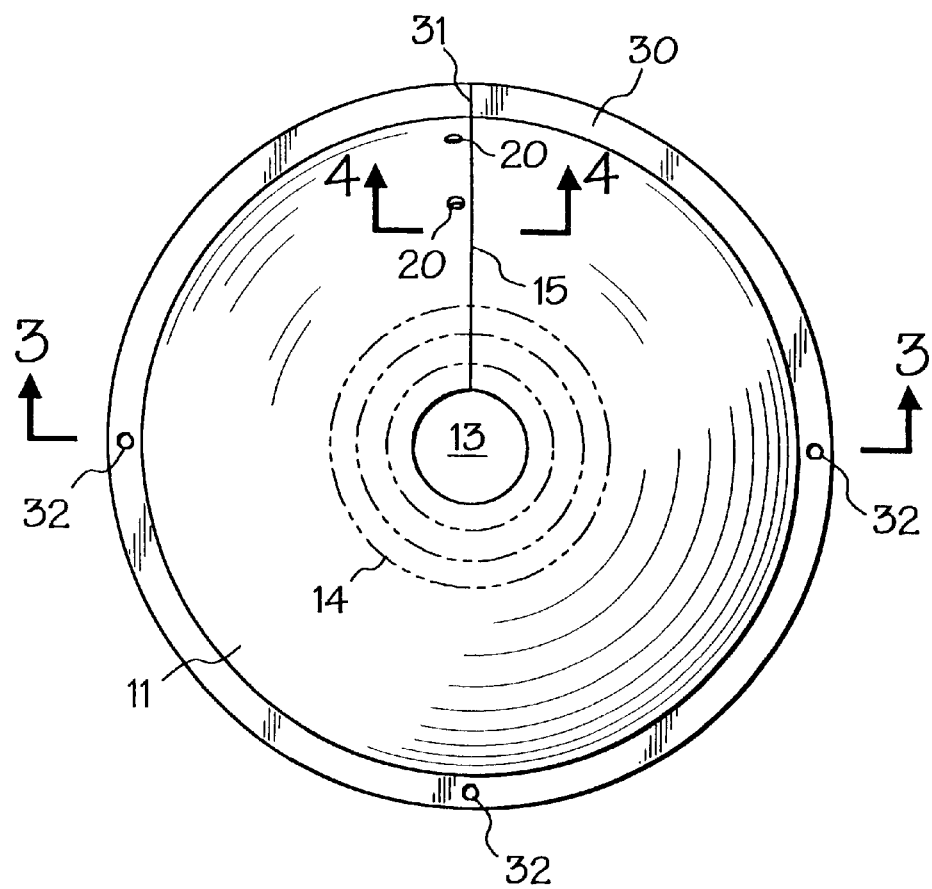
FIG. 2 is a top plan view of the mound-like tree skirt of FIG. 1.

An approximately centered opening 13 is located in the apex of the generally dome-shaped body 11. The opening 13, as evident in FIG. 1, accommodates the tree's trunk. A opening diameter of from about four inches to about twelve inches is sufficient, though a smaller or larger diameter opening can be used depending on the particular sized tree where the mound-like tree skirt 10 is to be used. As illustrated in FIG. 2, one or more score lines 14 can be provided around the opening which provides an easy means to enlarge the opening 13 as need dictates. Still with reference to FIGS. 1–3, the open-bottom generally dome-shaped body 11 of the mound-like tree skirt 10 also has a spreadable radial slit 15 extending from the opening 13 to the body's peripheral edge 12. The slit 15 is normally closed. That is, the radial slit 15 creates two edges which abut against one another or slightly overlap each other. During installation, the two edges of the slit are forced apart a sufficient distance for the tree skirt 10 to be positioned at a base of the tree with the tree trunk ultimately in the approximately centered opening 13. The force can then be removed and the edges resume their normal abutting or overlapping relationship.

While not necessary, though highly preferred, a slit closure means is provided to ensure the edges of the slit are retained in a natural appearing and abutting or overlapping relationship. Any means can be used which at least temporarily holds the two edges together. Examples include an adhesive tape, brackets, staples and clips.

Figure 4:
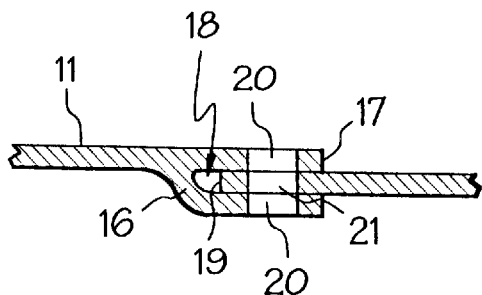
FIG. 4 is a partial view in section of a friction-fit closure means found on the mound-like tree skirt of FIG. 2 taken along line 4—4 thereof.

A highly preferred closure means found on the mound-like tree skirt 10 is best seen in FIG. 4. A narrow elongated ledge member 16 preferably of the same physical characteristics as that used in the generally dome-shaped body 11 is bonded to the dome-shaped body 11 near a first edge 17 of the slit 15. The ledge 16 preferably is bonded to the underside of the dome-shaped body for appearance purposes and extends substantially the full length of the radial slit. It can as well be on the upper side. It is bonded along a distal edge to create an open-sided pocket 18. An unattached area of the ledge 16 of sufficient width forms the 15 pocket 18 to receive an opposed second edge 19 of the slit 15. The second edge 19 is readily slipped into the pocket 18 and is retained there by friction.

Preferably, still with reference to FIG. 4 and also FIGS. 1–3, one or more holes 20 are provided along the first edge 17 of the radial slit 15 of the dome-shaped body 11 and the underlying elongated ledge member 16. An aligned hole 21 near the opposed second edge 19 of the radial slit 15 is provided for each of the holes 20 near the slit's first edge 17. Pegs 22, as depicted in FIG. 1, are dimensioned to fit through the aligned holes and add further assurance that the radial slit 15 remains closed. Each peg 22 preferably has a shank and a flattened head to prevent the peg from passing fully through the hole during installation.

Figure 5:
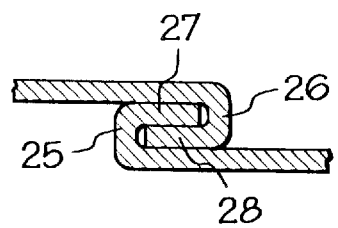
FIG. 5 is a partial view in section of an alternative interlocking closure means which can be used on the mound-like tree skirt of the invention.

A less preferred slit closure means because of manufacturing reasons for the mound-like tree skirt of the invention and best seen in FIG. 5 is a set of interlocking curled edges 25 and 26. Each edge of the slit is shaped to bend back upon itself to result in an inwardly directed U-shaped edge. A terminal leg 27 of one Ushaped edge is manipulated to fit into a closed space formed by a terminal leg 28 of the other edge and effectively be locked in. Such a manipulation is easily accomplished and is also easily reversed if need be.

Another essential feature of the mound-like tree skirt 10 is a substantially horizontal ground-engaging anchor lip 30 which extends circumferentially from the peripheral edge 12. The anchor lip 30 is primarily used as a means to aid in holding the mound-like tree skirt in place during use over an extended time period. It provides a flat lower surface to rest on the ground. It also provides a flat upper surface over which lawnmower wheels can roll without concern for lawnmower blade damage. A slit 31 extending through the lip 30 is in alignment with the radial slit 15 extending through the generally dome-shaped body 11. The lip 30 is about two inches to about six inches in width and has at least one hole to receive an anchor stake. As shown, three holes 32 are used. The holes are at about ninety degree intervals from the slit. Preferably, three to ten substantially equi-spaced holes are used for optimum hold-down. While not necessary, punch-out holes can be formed in the lip and the user can create as many holes as desired for stabilization.

An anchor stake 33, as seen in FIG. 1, for each hole 32 in the anchor lip 30 is used to hold the tree skirt 10 in place. Each stake has an elongated shank with a pointed end for forcing into the ground and a flattened head having a diameter slightly greater than the hole diameter. The number of stakes used corresponds to the number of holes provided in the anchor lip.

A highly preferred, though optional, feature is best seen in FIG. 3. A water pervious netting 34 is attached at or near the approximately centered opening 13 in the apex of the generally dome-shaped body 11. The netting 34 extends vertically downwardly and has a vertical slit 35 which is in alignment with the radial slit 15 in the generally dome-shaped body 11. The netting is used to wrap around the tree trunk to smother out unwanted vegetation growth at the tree trunk base.

Figure 6:
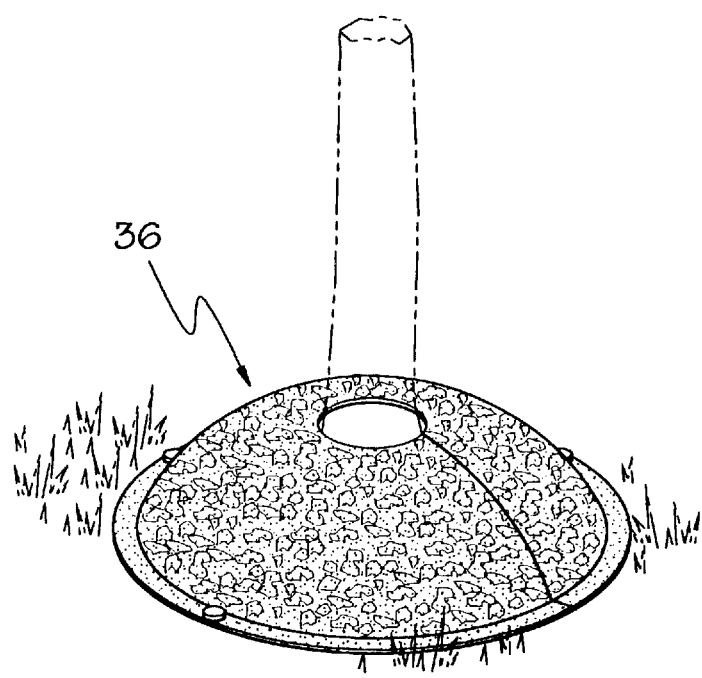
FIG. 6 is an environmental view of a mound-like tree skirt of the invention showing a decorative surface.

The mound-like tree skirt preferably has a natural earth color, e.g. brown. With reference to FIG. 6, a preferred mound-like tree skirt 36 is given a natural mulch surface appearance in both color and texture. That is, an outside surface of the generally dome-shaped body is molded with a rumpled appearance. Still other surface appearances of a decorative nature can be applied to the tree skirt. For example, the tree skirt's outside surface can be given a rock-like, crushed stone, flowered or other appearance by any conventional method such as painting, stencilling or applying a decal.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A mound-like tree skirt for positioning around a tree trunk at ground level for protecting the tree trunk from accidental contact with lawn care equipment and inhibiting unwanted vegetation growth, said tree skirt comprising: a one-piece open-bottom generally dome-shaped body made of a semi-rigid wood pulp material and having an outside surface with a natural ground or mulch appearance, said dome-shaped body further having (i) an approximately centered opening in an apex of the dome to accommodate the tree trunk, (ii) a spreadable radial slit extending from the approximately centered opening to a peripheral edge, (iii) a slit closure means to hold edges of said radial slit together in an abutting or overlapping relation, and, (iv) a substantially horizontal ground-engaging anchor lip extending circumferentially from the peripheral edge to lie flat on the ground with at least one hole extending through said lip , each said at least one hole for receiving an anchor stake to hold said tree skirt in a stationery position.

2. The mound-like tree skirt of claim 1 wherein the closure means is an elongated ledge member extending along a first edge of the radial slit and bonded in a manner to form an open-sided pocket, said open-sided pocket for receiving an opposed second edge of the radial slit in a friction-fit to hold said edges together.

3. The mound-like tree skirt of claim 2 further comprising at least one hole near the first edge of the radial slit and extending through the elongated ledge member and further an aligned hole near the opposed second edge of slit so as to receive a peg for holding said edges together.

4. The mound-like tree skirt of claim 1 wherein the closure means are interlocking curled edges dimensioned to receive and hold one another.

5. The mound-like tree skirt of claim 1 further having a water pervious netting attached to the open-bottom generally dome-shaped body near the approximately centered opening to encompass the tree trunk base so as to smother unwanted vegetation.

6. The mound-like tree skirt of claim 1 wherein the open-bottom generally dome-shaped body has an interior base diameter of from about eighteen inches to about thirty-six inches and a height of from about three inches to about nine inches.

7. The mound-like tree skirt of claim 6, further wherein the ground-engaging anchor lip has a width of from about two inches to about six inches.

8. The mound-like tree skirt of claim 1 wherein there are from three to ten holes in the ground-engaging anchor lip.

9. The mound-like tree skirt of claim 8, wherein the holes in the anchor lip are substantially equi-spaced therearound.

10. A mound-like tree skirt for positioning around a tree trunk at ground level for protecting the tree trunk from accidental contact with lawn care equipment and inhibiting unwanted vegetation growth, said tree skirt comprising: a one-piece open-bottom generally dome-shaped body having a peripheral edge and an apex with a smooth curved shape extending from the peripheral edge to the apex, and made of a semi-rigid wood pulp material with sufficient rigidity to retain its shape without collapsing upon itself and with sufficient flexibility to allow manipulative bending during installation around the tree trunk, said body further having (i) an approximately centered opening in the apex of the dome to accommodate the tree trunk, (ii) a spreadable radial slit extending from the approximately centered opening to the peripheral edge with closure means to hold edges of the slit in an abutting or overlapping relation and, (iii) a substantially horizontal ground-engaging anchor lip extending circumferentially from the peripheral edge to lie flat on the ground for receiving anchor stakes to hold said tree skirt in a stationery position.

11. The mound-like tree skirt of claim 10 wherein the closure means is an elongated ledge member extending along a first edge of the radial slit and bonded in a manner to form an open-sided pocket, said open-sided pocket for receiving an opposed second edge of the radial slit in a friction-fit to hold said edges together in an overlapping relation.

12. The mound-like tree skirt of claim 11 further having a water pervious netting attached to the open-bottom generally dome-shaped body near the approximately centered opening to encompass the tree trunk so as to smother unwanted vegetation.

13. The mound-like tree skirt of claim 10 wherein the substantially horizontal ground-engaging anchor lip has three to ten substantially equi-spaced holes extending through said lip to receive an anchor stake in each said hole to hold said tree skirt in a stationery position.

14. The mound-like tree skirt of claim 13 wherein the openbottom generally dome-shaped body is one-piece with an interior base diameter of from about eighteen inches to about thirty-six inches and a height of from about three inches to about nine inches and further the ground-engaging anchor lip has a width of from about two inches to about six inches.

15. A mound-like tree skirt for positioning around a tree trunk at ground level, said tree skirt comprising: a one-piece open-bottom generally dome-shaped body made of a semi-rigid wood pulp material and having a mulch-like decorative outside surface, said body further having (i) an approximately centered opening in an apex of the dome and having a water pervious netting extending therearound to accommodate the tree trunk, (ii) a radial slit extending from the approximately centered opening to a peripheral edge with an underlying elongated ledge member extending along a first edge of the radial slit and bonded thereto in a manner to form an open-sided pocket, said pocket for receiving an opposed second edge of the radial slit and, (iii) a substantially horizontal ground-engaging anchor lip extending circumferentially from the peripheral edge to lie flat on the ground with three to ten substantially equi-spaced holes extending through said lip for receiving an anchor stake in each said hole to hold said tree skirt in a stationery position.

16. The mound-like tree skirt of claim 15 further wherein at least one hole is provided near the first edge of the radial slit and extending through the elongated ledge member and further an at least one aligned hole provided near the opposed second edge of the radial slit so that a peg driven through said aligned holes hold said edges together in an overlapping relation.

* * * * *